United States Patent
Kuehmann et al.

(10) Patent No.: US 6,176,946 B1
(45) Date of Patent: Jan. 23, 2001

(54) ADVANCED CASE CARBURIZING SECONDARY HARDENING STEELS

(75) Inventors: Charles J. Kuehmann, Deerfield; Gregory B. Olson, Riverwoods, both of IL (US); John P. Wise, Boulder, CO (US); Carelyn Campbell, Gaithersburg, MD (US)

(73) Assignee: Northwestern University, Evanston, IL (US)

( * ) Notice: Under 35 U.S.C. 154(b), the term of this patent shall be extended for 0 days.

(21) Appl. No.: 09/239,131

(22) Filed: Jan. 28, 1999

Related U.S. Application Data

(60) Provisional application No. 60/072,834, filed on Jan. 28, 1998.

(51) Int. Cl.[7] ........................... C22C 38/10; C22C 38/08; C22C 38/30
(52) U.S. Cl. ........................ 148/319; 148/328; 148/326
(58) Field of Search .................................. 148/319, 586, 148/328, 326, 225, 226; 420/8, 112

(56) References Cited

U.S. PATENT DOCUMENTS

| | | | |
|---|---|---|---|
| 5,002,729 | * 3/1991 | Wert et al. | 148/319 |
| 5,268,044 | 12/1993 | Hempill et al. | |
| 5,279,902 | 1/1994 | Materkowski | |
| 5,424,028 | * 6/1995 | Maloney et al. | 420/38 |
| 5,741,374 | * 4/1998 | Li | 148/319 |

OTHER PUBLICATIONS

European patent abstract, 87890232, Jun. 1, 1988.*

* cited by examiner

*Primary Examiner*—Deborah Yee
(74) *Attorney, Agent, or Firm*—Banner & Witcoff, Ltd.

(57) ABSTRACT

Steel alloys susceptible to case and core hardening comprising 0.05 to 0.24 weight percent carbon; 15 to 28 weight percent cobalt and 1.5 to 9.5 weight percent in nickel, small percentages of one or more additives: chromium, molybdenum, and vanadium; and the balance iron.

3 Claims, 9 Drawing Sheets

FIG. 1 CORRELATION OF PEAK HARDNESS DURING TEMPERING AT 510 C TO THE COHERENT DRIVING FORCE FOR THE PRECIPITATION OF $M_2C$ CARBIDE IN THE PRESENCE OF PARAEQUILIBRIUM CEMENTITE

FIG.2 CORRELATION OF THE HALF-COMPLETION TIME WITH THE HALF-COMPLETION COARSENING RATE CONSTANT FOR A NUMBER OF MODEL ALLOYS TEMPERED AT 510 C

FIG. 3 CORRELATION BETWEEN THE CALCULATED SEGREGATION FREE ENERGY DIFFERENCE AND THE EXPERIMENTALLY OBSERVED EMBRITTLING SENSITIVITY.

FIG. 5 $M_S$ TEMPERATURE CALCULATIONS FOR THE CASE COMPOSITION OF THE SECONDARY-HARDENING GEAR STEEL.

FIG.6 PHASE FIELDS ON A PSEUDO-TERNARY DIAGRAM AS A FUNCTION OF Cr, Mo, AND V CONTENT. THE C CONTENT IS 0.55 wt% AND THE REMAINING COMPOSITION IS TAKEN FROM THE MATRIX COMPOSITION.

ADVANCED CASE CARBURIZING SECONDARY HARDENING STEELS

This application claims benefit to U.S. Provisional application No. 60/072,834 filed Jan. 28, 1998.

This application is funded by Army Research Office, Grant No. DAAH04-96-1-0266.

BACKGROUND OF THE INVENTION

This invention relates to a new class of steel alloys especially useful for the manufacture of case hardened gears and other products made from case carburized steel alloys.

Currently, there are a number of high performance gear and bearing steels on the market. A number of these materials utilize primary carbides to achieve their high surface hardness and others use stage one or stage three tempered conditions with epsilon carbide or cementite strengthening. Primary carbides are formed when the carbon content exceeds the solubility limit during the solution treatment and large alloy carbides precipitate. This is the case in particular for secondary hardening steels using alloy carbide strengthening for greater thermal stability to improve properties such as scoring resistance. However, research indicates that primary carbide formation can have a detrimental impact on both bending and contact fatigue resistance. Formation of primary carbides can also make process control difficult for avoidance of undesirable carbide distributions such as networks. In addition, primary carbide formation in current gear and bearing steel can lead to a reversal in the beneficial residual compressive stresses at the surface. This is due to a reversal of the spatial distribution of the martensite start temperature due to the consumption of austenite stabilizing elements by the primary carbides. Thus, there has developed a need for case hardenable steel alloys which do not rely upon primary carbide formation, but provide secondary hardening behavior for superior thermal stability. This invention provides a new class of steel meeting this requirement, while exploiting more efficient secondary hardening behavior to allow higher surface hardness levels for even greater improvements in fatigue and wear resistance.

In applications of sliding wear the formation of primary carbides can be beneficial; however, in current gear and bearing steels this can lead to a reversal in the beneficial residual compressive stresses at the surface due to the consumption of elements promoting hardenability by the primary carbides.

Thus, there has developed a need for case hardenable steel alloys which do not rely upon primary carbide formation.

SUMMARY OF THE INVENTION

Briefly, the present invention comprises a class of case hardenable steel alloys with carbon content in the range of about 0.05 weight percent to about 0.24 weight percent in combination with a mixture of about 15 to 28 weight percent cobalt, 1.5 to 9.5 weight percent nickel, 3.5 to 9.0 weight percent chromium, up to 3.5 weight percent molybdenum, and up to 0.2 weight percent vanadium.

The microstructural features are a Ni—Co lath martensite matrix steel strengthened by $M_2C$ carbides typically containing Cr, Mo and V. Typical processing of this class of steels includes case carburizing, solution treatment, quenching, and tempering, although due to the high alloy content, quenching may not be required. Case carburizing produces a gradient in the volume fraction of the $M_2C$ carbides and results in a concomitant increase in hardness and promotes a surface residual compressive stress. The efficiency of the $M_2C$ strengthening response allows this class of steels to achieve very high surface hardnesses with limited soluble carbon content. Thus, this class of steels have the ability to achieve very high surface hardnesses without the formation of primary carbides.

Typical advantages of this class of alloys include ultra-high case hardness leading to superior wear and fatigue resistance, superior core strength and toughness properties, optional air hardening resulting in less distortion, and higher thermal resistance.

This new class of secondary hardening gear and bearing steels are matrix steels utilizing an efficient $M_2C$ precipitate strengthening dispersion. Because of the efficiency of this strengthening dispersion, a superior combination of properties can be attained for a given application. For example, in situations where the desired surface properties are similar to current materials, the core strength and toughness can be superior. In applications where superior surface properties are desired, the disclosed steels can easily outperform typical materials while maintaining normal core properties, and in applications which require corrosion resistance, these new steels can provide stainless properties with surface mechanical properties similar to typical non-stainless grades.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENTS

Figure 1:
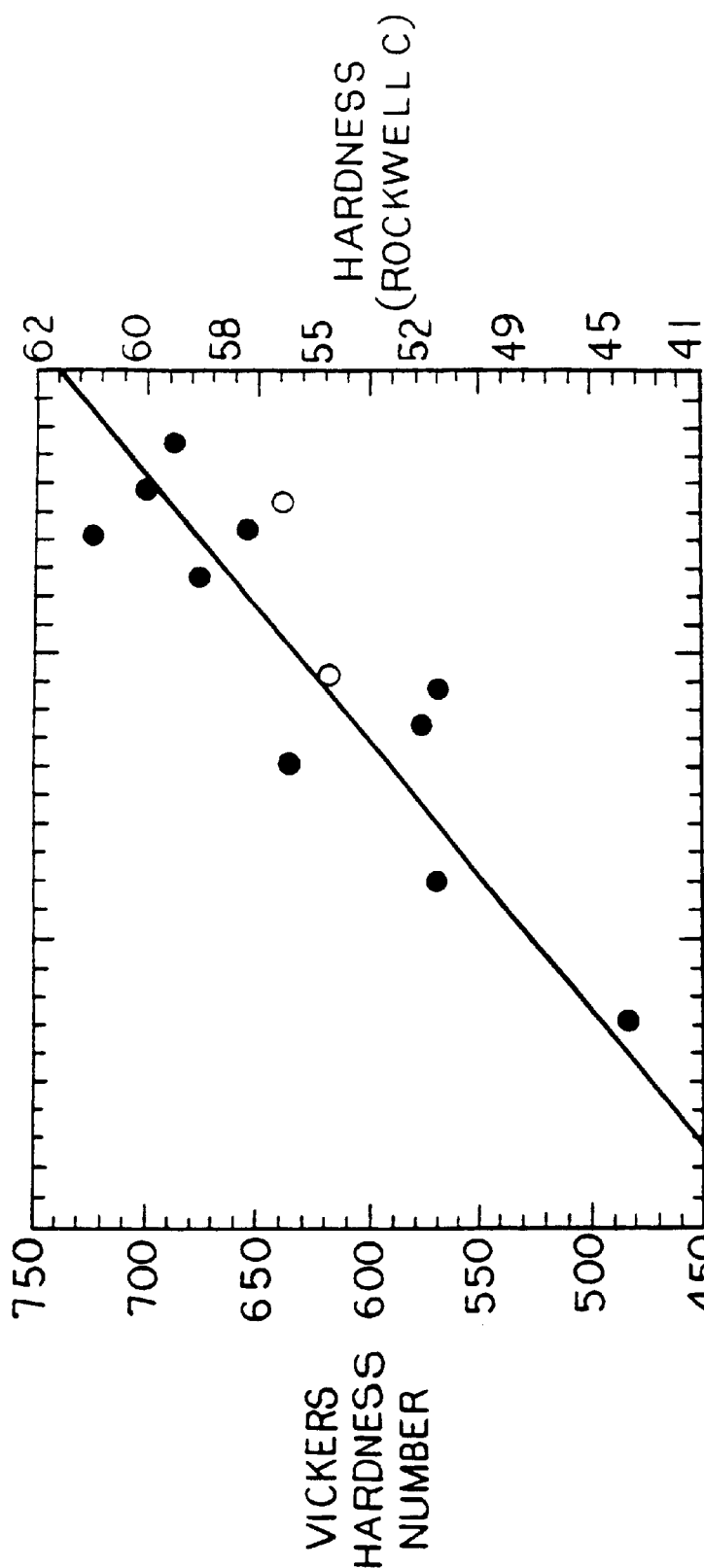
FIG. 1 is a graph correlating hardness to precipitation driving force for experimental and predicted results.

The steel alloys of the invention were developed using various modeling techniques followed by experimental confirmation or testing. An important component of the modeling is the application of a thermochemical data bank and software system. The system or program employed uses thermodynamic assessments from binary, ternary, and quaternary systems to extrapolate to higher order multicomponent systems. Equilibria, constrained equilibria, and driving forces can be calculated as functions of composition, chemical potential, as well as other user defined functions. To apply this information to the modeling of highly nonequilibrium processes of interest in real alloys, the dynamic nature of phase transformations in terms of thermodynamic scaling factors are described and then evaluated by the Thermochemical software. Thus, hypothetical steel compositions were the subject of an initial computational model involving the precipitation of $M_2C$ carbides leading to a secondary hardening response in ultrahigh-strength steels. A second effort employed a published thermodynamics-based model for the non-linear composition dependence of the martensite start temperature. A third modeling effort involves the application of quantum mechanical calculations to the production of hypothetical compositions with the goal of achieving improved resistance to hydrogen embrittlement and intergranular fracture. Modeling techniques were then followed by testing of the optimized alloys. Following is a discussion of modeling technique considerations.

Secondary Hardening

Ultrahigh-strength (UHS) secondary hardening steels are strengthened by the precipitation of coherent $M_2C$ carbides during tempering. In high Co steels in which dislocation recovery is retarded, the $M_2C$ carbides precipitate coherently on dislocations and provide the characteristic secondary hardening peak during tempering. A wide range of techniques are utilized to gather experimental information across a complete range of size and time scales of interest. Atom-probe field-ion microscopy (APFIM), transmission electron microscopy (TEM), small angle neutron scattering (SANS), and X-ray diffraction (XRD) techniques provide information on the size, shape, composition, and lattice parameters of the $M_2C$ precipitates as well as the resulting hardness values spanning tempering times of less than an hour to more than a thousand hours. This study identified that the precipitation was well described by a theory developed by Langer and Schwartz for precipitation at high supersaturation in which the growth regime is suppressed and precipitation occurs by a process of nucleation and coarsening, maintaining a particle size close to the critical size.

Based on these investigations, two important scaling factors are identified. The initial critical nucleus determines the size scale of the precipitates throughout the precipitation reaction and the coarsening rate constant determines the precipitation time scale. The peak hardness in an ultra high strength steel commonly occurs at the particle size corresponding to the transition from particle shearing to Orowan bypass. It is also advantageous to bring the $M_2C$ precipitation to completion in order to dissolve all of the transient cementite which otherwise limits toughness and fatigue life. Therefore, the smaller the initial critical particle size, the closer completion of precipitation occurs to peak hardness and more efficient strengthening is obtained. The time scale of precipitation is also important due to the kinetic competition between the secondary hardening reaction and the segregation of impurities to the prior austenite grain boundaries leading to intergranular embrittlement.

The initial critical nucleus size scales inversely with the thermodynamic driving force for precipitation. In the case of the $M_2C$ carbide it is important to include the influence of prior cementite formation and coherency on this quantity. The coherency elastic self energy can be evaluated by the calculation of an anisotropic ellipsoidal inclusion using the equivalent Eigenstrain method and the impact of solute redistribution on the resulting stress distribution is addressed by using open-system elastic constants. By relating the coherency strain to composition via the compositional dependence of the particle and matrix lattice parameters, the composition dependence of the elastic self energy is determined in a form compatible with the thermodynamic software. The linear elastic self energy calculation represents an upper limit and a correction factor is used to fit the precipitation composition trajectories of a large set of experimental alloys.

The impact of prior cementite precipitation is accounted for by the calculation of the coherent driving force in the presence of the carbon potential due to para-equilibrium cementite. This para-equilibrium carbon potential is defined by an equilibrium between the matrix and cementite in which the substitutional species are held constant and only the interstitial carbon is allowed to partition. In this approximation the cementite acts as a carbon source at constant chemical potential.

FIG. 1 represents the level of agreement of the strengthening response of the model alloys with the above model. The model alloys contain 16 wt % Co, 5 wt % Ni, and 0.24 wt % C with varying amounts of the carbide formers Cr, Mo, and, in a few cases, V. The nickel content is chosen to eliminate austenite precipitation during tempering which otherwise complicates the hardening response. In FIG. 1, the peak hardness during tempering at 510° C. is plotted against the driving force for precipitation of the coherent $M_2C$ carbide in the presence of para-equilibrium cementite. The open circles represent alloys containing V. The relationship demonstrates the ability to predict peak hardness values within approximately +/−25 VHN in this class of alloys.

The time scale of precipitation at high supersaturations, according to the Langer-Schwartz treatment, scales with the coarsening rate of the particle distribution. The modeling pursued in this work expands upon the Lifshitz-Slyozov and Wager (LSW) theory, describing the coarsening of spherical particles in a binary system, with the intent of removing the binary restrictions of the LSW theory and reformulating it in a manner compatible with the multicomponent thermodynamics of the software and data bank system.

The result of this analysis characterizes the coarsening rate of a particle of average size as a function of the multicomponent diffusion coefficients, the equilibrium partitioning coefficients, and the second derivatives of the Gibbs free-energy evaluated at the equilibrium state. The surface energy and molar volume are taken to be composition independent and are considered constant. In this form, the coarsening rate constant is the result of an asymptotic analysis and is only representative at very long time scales and very close to equilibrium. This is certainly not the case for the precipitation of the $M_2C$ carbide at high supersaturation. The matrix content of alloy is far from equilibrium during much of the precipitation process, approaching equilibrium only near completion. This effect is more severe for alloys containing stoichiometric quantities of carbide formers as measured by the relative difference in the matrix alloy content during precipitation and at equilibrium.

Figure 2:
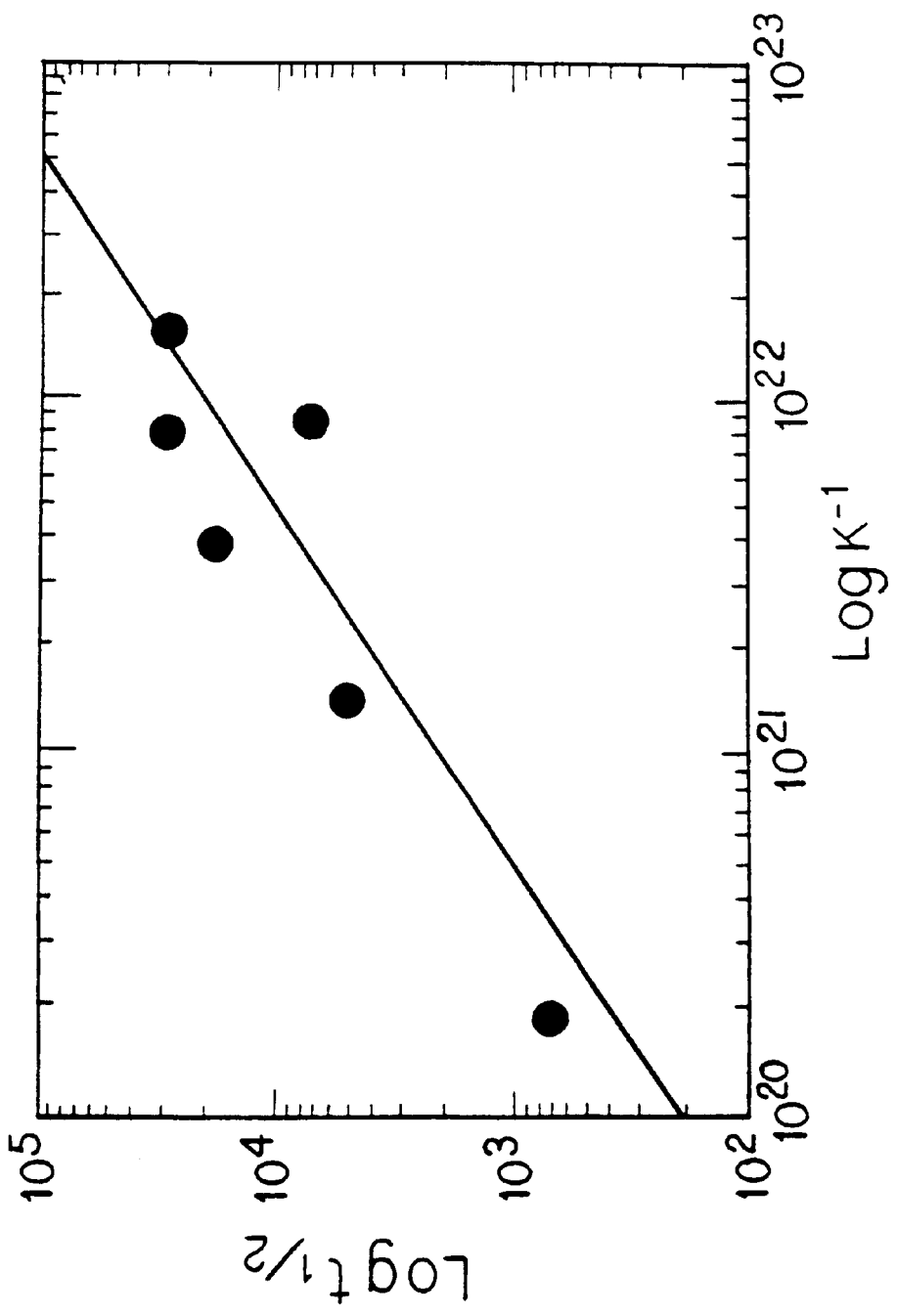
FIG. 2 is a graph correlating precipitation half completion time and half completion coarsening rate constant for experimental and predicted results.

During precipitation in a stoichiometric alloy, the alloy matrix content is of the same order as the overall alloy content, while at equilibrium, the matrix alloy content is very small. To define a coarsening rate constant more representative of the conditions present during the precipitation process, a coarsening rate is evaluated at the point when the volume fraction of the precipitate is one-half of the equilibrium value. This is achieved by calculating the coherent equilibrium for the $M_2C$ carbide, and then, adding energy to the $M_2C$ phase to account for capillarity until the amount of the phase is half of the equilibrium value. The coarsening rate is then calculated from the thermodynamic properties of this state. FIG. 2 represents the correlation between the precipitation half-completion time and the half-completion coarsening rate constant of the model alloys for which this data is available.

Ms Temperatures

To predictively control the spatial distribution of martensite-start (Ms) temperatures in the carburized steels to achieve fully martensitic structures with controlled residual stress distributions, a published model was employed. The thermodynamics-based nucleation-kinetic model was calibrated to the composition-dependence of measured Ms temperatures using both literature data and assessments of experimental multicomponent alloys.

Interfacial Cohesion

Intergranular embrittlement phenomena such as hydrogen embrittlement are undesirable in the intended alloys. Embrittlement of ultrahigh-strength steels is associated with the prior segregation to the grain boundary of impurities such as P and S. A thermodynamic treatment of this phenomenon by Rice and Wang illustrates that the potency of a segregating solute in reducing the work required for brittle fracture along a boundary is linearly related to the difference in the segregation energy for the solute at the boundary and at the free surface. Specifically, a solute with a higher segregation energy at the free surface will be an embrittler while a solute with a higher segregation energy at the grain boundary will enhance intergranular cohesion. A survey of reported segregation energies and embrittling potency (reported as the shift in the ductile-to-brittle transition temperature per atomic percent solute on the grain boundary) in Fe-base alloys demonstrates these general trends; however, the experimental difficulty of surface thermodynamic measurements gives ambiguous values for some solutes.

First principle calculations were used to determine the total energy of atomic cells representing the Fe $\Sigma 3$ [110]( 111) grain boundary and (111) free surface with a monolayer of an impurity solute present. The calculations were accomplished with the full-potential linearized plane wave (FLAPW) total energy technique. The atomic structure in each case was relaxed to find the minimum energy state. The results of these calculations include not only the segregation energies responsible for the embrittling or cohesion enhancing effects of segregating solutes, but the underlying electronic structure of the solutes in the boundary and surface environments. A comparison of the directional covalent electronic structure between B, a strong cohesion enhancer, and P, a strong embrittler, indicates the strong bonding of the B atom across the boundary plane associated with hybridization of the B 2p electrons with the Fe d band. This directional bonding is not seen in the case of the P atom which does not significantly hybridize with Fe.

Figure 3:
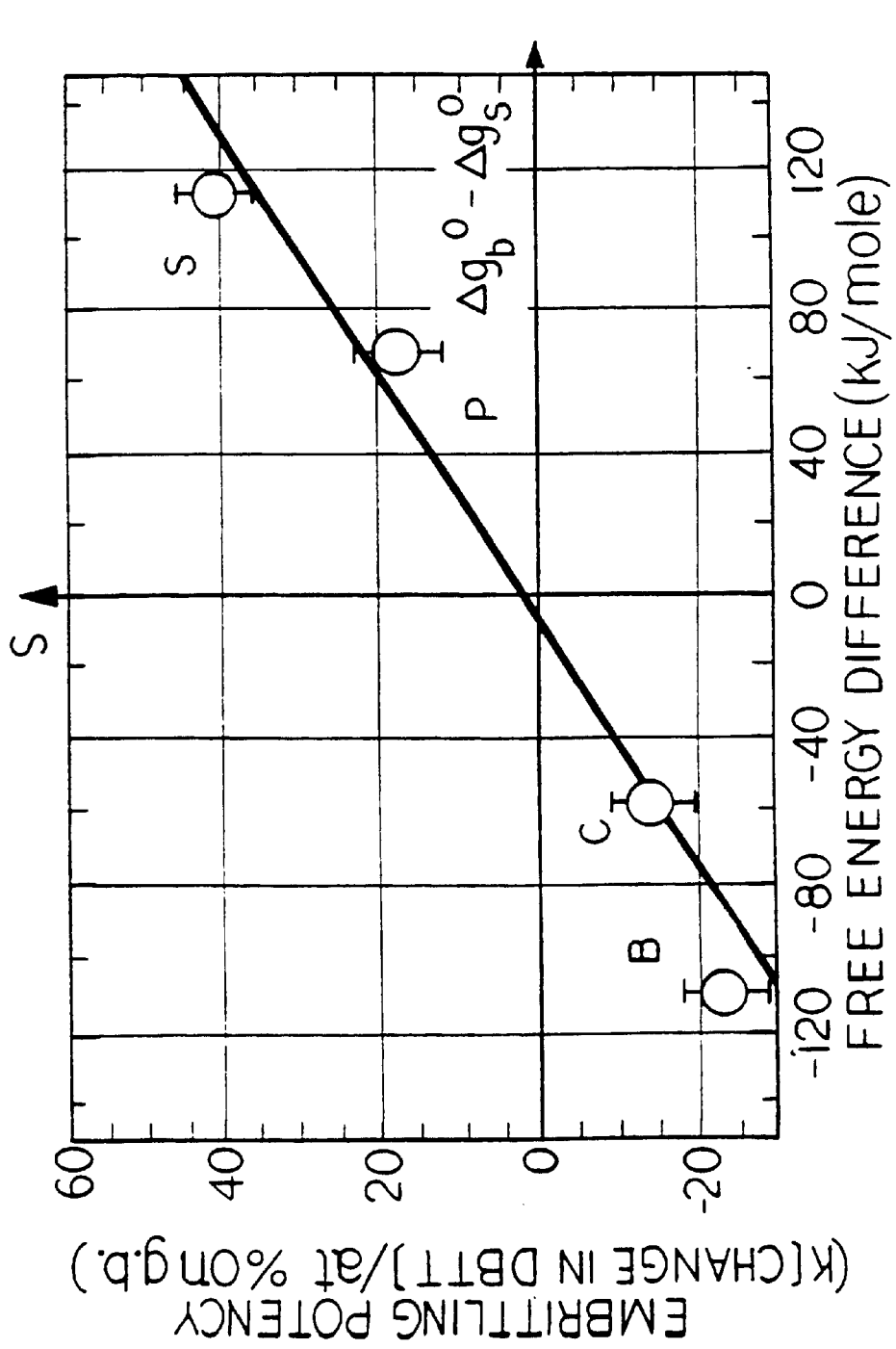
FIG. 3 is a graph which correlates calculated segregation free energy difference with experimental embrittlement potency.

The results of the first principle calculations were correlated to the experimental embrittling potency in FIG. 3. The difference between grain boundary and free surface segregation energies, calculated by electronic structure calculations, and the experimentally observed shift in the ductile-to-brittle-transition-temperature are plotted for C, B, P and S solutes. The C and B are shown as cohesion enhancers, P and S as embrittlers. The computed energy differences are in excellent agreement with the observed effects on interfacial cohesion.

MATERIALS DESIGN

Background

Design considerations for high performance gears in aerospace, automotive, and other applications include the desire to transmit more power in less space and with less gear weight. Current high performance gear steels are typically stage I quench and tempered martensites, case hardened through carburizing to 60 $R_c$ on the surface with a core hardness of typically 35 $R_c$ as gear teeth are typically subjected to bending and contact stresses. Failure modes in gears are generally grouped into three categories, tooth breakage, surface pitting, and subsurface spalling. High surface hardness is used to limit the tooth breakage due to bending fatigue as well as pitting failures. If the contact fatigue strength drops below the applied stress at any point below the surface, subsurface spalling can result. Typically a 1 mm case depth is required to provide adequate fatigue strength to avoid subsurface spalling.

Stage IV tempered secondary hardening steels offer numerous advantages over conventional gear steels. The efficient strengthening and superior toughness achieved in secondary hardening steels allows greater core and case hardness to be attained reducing the size and weight of gears needed to transmit a given power. The greater temperature resistance of secondary hardening steels allows operation at higher temperatures and longer times before performance degrades through mechanisms such as scoring. In addition, recent results on commercial secondary hardening alloys indicate casting of these steels may be possible.

Analysis

Figure 4:
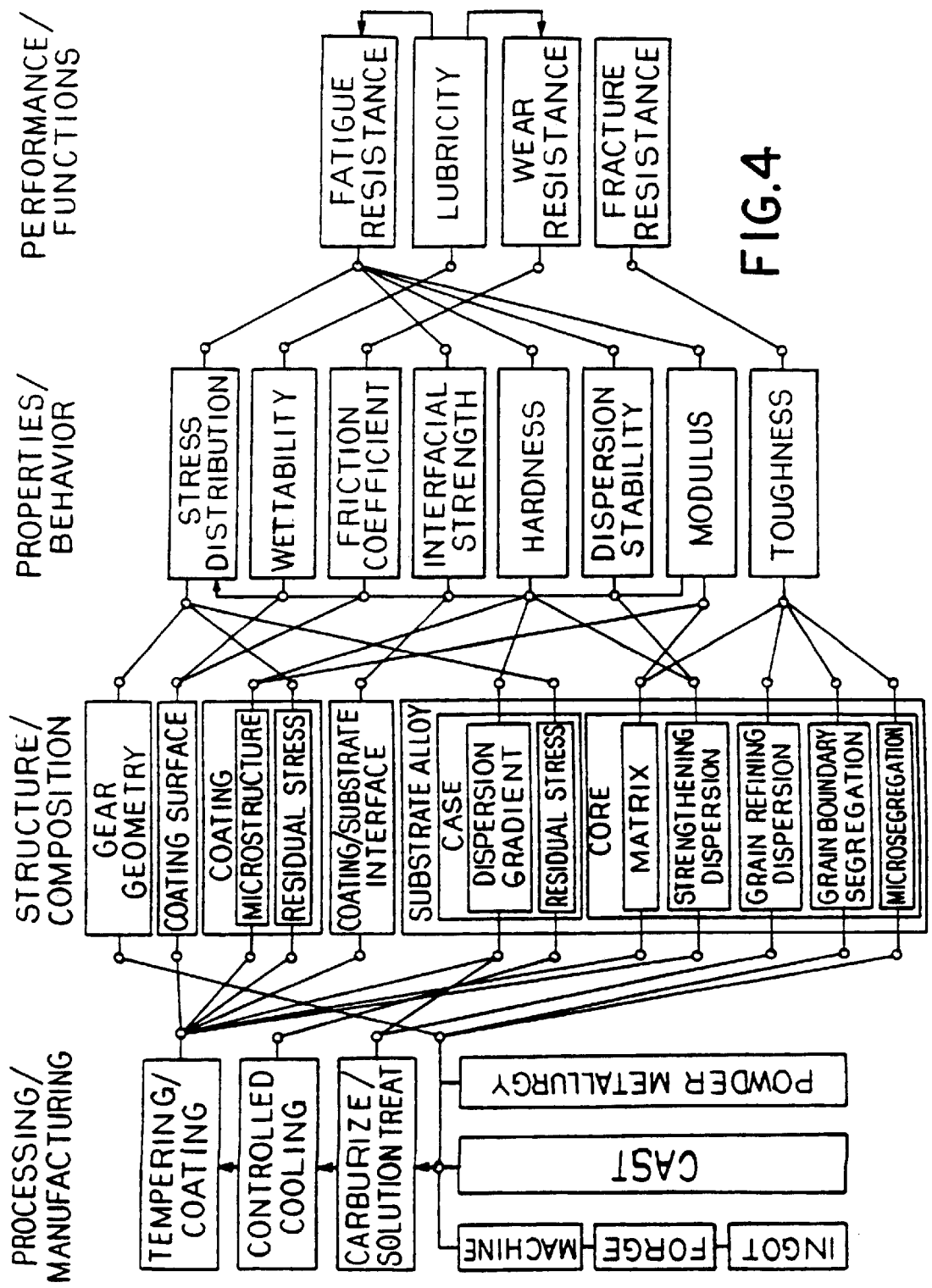
FIG. 4 is a flow block diagram of the total system structure of the alloys of the invention.

The systems analysis of the case-core secondary hardening steel system is the first step in the design process. FIG. 4 illustrates the total processing/structure/properties/ performance system structure for high power-density gears manufactured by three alternative processing routes, conventional forged ingot processing, near net shape casting and powder processing. Case hardenable secondary hardening gear steels are a subsystem of this flow-block diagram and are the focus of this disclosure. The sequential processing steps dictate the evolution of the case and core microstructures which determine the combination of properties required for the overall performance of the system. Both the case and core consist of microstructures of a martensite with high Co, for dislocation recovery resistance essential for efficient secondary hardening, and Ni, for cleavage resistance. Strengthening is provided by the coherent precipitation of fine $M_2C$ carbides on dislocations. This secondary hardening reaction dissolves the transient cementite and it brings the precipitation reaction to completion in order to eliminate cementite for high toughness and fatigue resistance. The grain refining dispersion has a double impact on toughness. By limiting grain growth at high temperature during solution treatment, brittle intergranular modes of fracture are inhibited.

The grain refining particles also play an important role in the ductile microvoid nucleation and coalescence fracture behavior. Thus, it is desired to preserve adequate volume fraction and size to pin the grain boundaries while choosing the phases with greatest interfacial cohesion. Also desirable is the control of the grain boundary chemistry to avoid intergranular embrittlement (such as by hydrogen embrittlement) in association with prior segregation of embrittling impurities. During tempering, impurities segregate to the grain boundaries and in the case of P and S reduce the interfacial cohesion of the boundary promoting intergranular embrittlement. A number of methods are used to avoid this problem. Gettering compounds can be utilized to tie up the impurities in stable compounds reducing the segregation to the grain boundary. In order to produce the most stable compounds, however, rapid solidification processing is required. Within their solubility limits, additional segregants such as B can be deliberately added to enhance intergranular cohesion, and the precipitation rate for the secondary hardening reaction can be increased to limit the time at temperature for harmful grain boundary segregation.

Design

As a first design step, core and case carbon levels required for the desired hardness are estimated. This is done by fitting data for existing secondary hardening Ni—Co steels to an Orowan strengthening model and extrapolating to the desired strength. It is estimated that a core carbon content of 0.25 wt % and a case carbon content of 0.55 wt % is needed to provide the desired core and case hardness in this Ni—Co steel.

Figure 5:
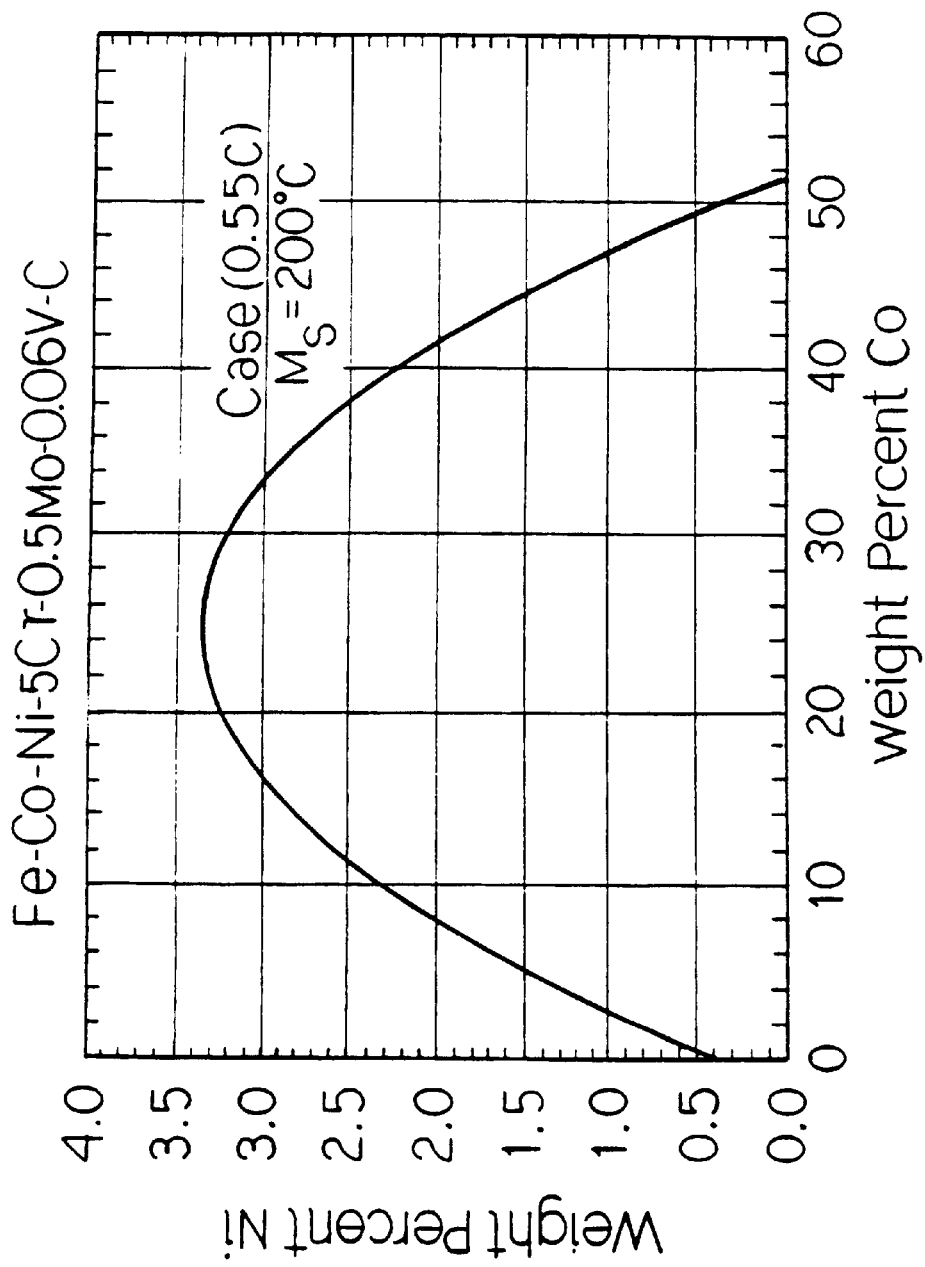
FIG. 5 is a graph depicting the relationship between cobalt and nickel content for a 200° C. Ms temperature for the alloys of the invention.

The next step is to determine the matrix composition of the Fe, Ni, and Co. In order to produce the desired lath martensite morphology, an Ms temperature of 200° C. or above is required. Using the nucleation kinetic model for the compositional dependence of the Ms temperature, the variation with Ni and Co content is determined. This result is illustrated in FIG. 5 for the case carbon content using a preliminary composition of carbon formers equal to 5 wt % Cr, 0.5 wt % Mo and 0.0 wt % V. Since the case has a higher carbon content than the core, the core will possess a higher Ms temperature than the case. In FIG. 5 the Co and Ni content required to fix the M temperature at 200° C. is indicated. Since a high Ni content is desired to avoid cleavage fracture, a composition containing 25 wt % Co was chosen. This allows the highest possible Ni content, approximately 3.5 wt %, to be used. These calculations are later repeated for consistency when the composition of the carbide formers is further refined.

To define the optimal composition of the carbide formers a number of design constraints are applied. The total amount of carbide formers in the alloy must be greater than that required to consume the carbon present in the case. This lower limit insures that, at completion, embrittling cementite is completely converted to $M_2C$ carbide. In order to reduce grain boundary segregation, the precipitation rate is maximized. This allows the shortest possible tempering time. The coherent precipitation driving force is maximized to provide a small critical particle size for the $M_2C$ and more efficient strengthening. Finally, the solution temperature is limited to 1000° C. This allows Cr, Mo and V containing carbides such as $M_{23}C_6$, $M_7C_3$, MC and $M_6C$ to be dissolved at reasonable processing temperatures while maintaining very fine scale TiC carbides to act as the grain refining dispersion.

Figure 6:
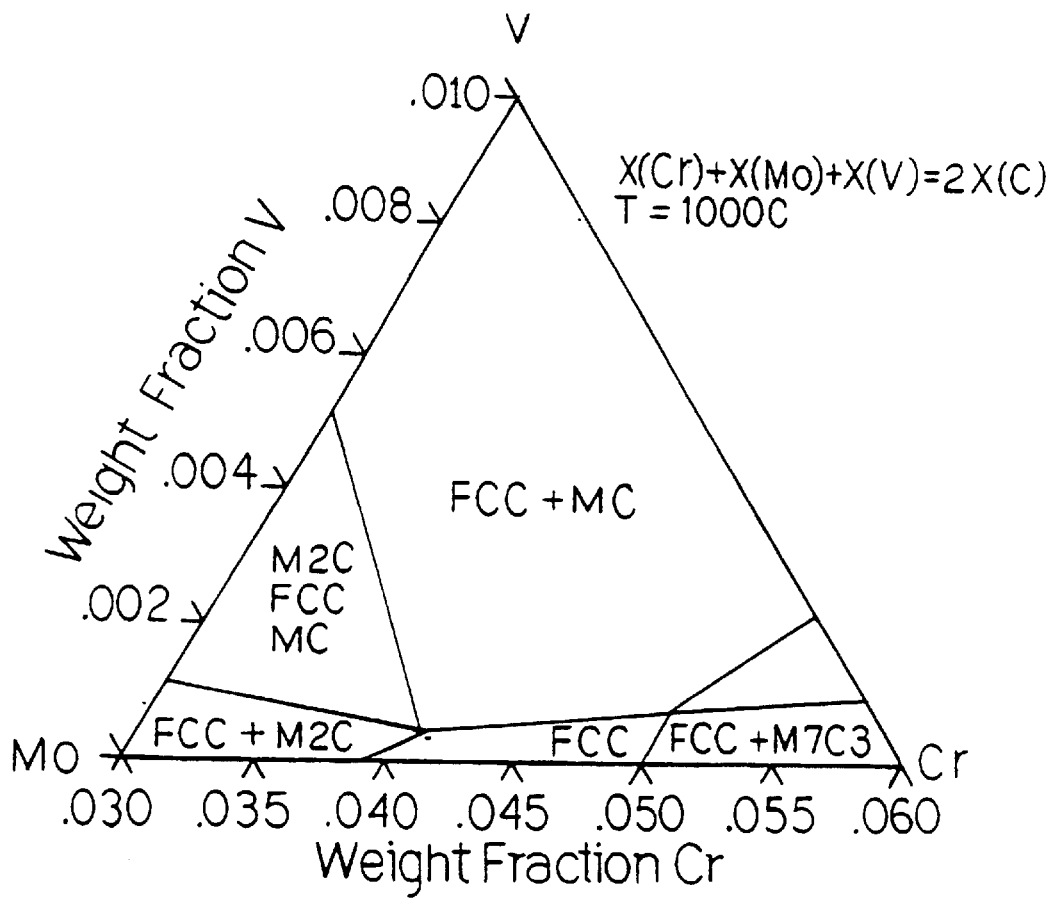
FIG. 6 is a pseudo-ternary diagram as a function of chromium, molybdenum and vanadium at 0.55 weight percent carbon with regard to alloys of the invention at 1000° C.

Calculations for the precipitation rate constant indicate low Mo compositions are favorable, while driving force calculations have demonstrated the highly beneficial effect of higher V contents. The solubility constraints are presented by the diagram in FIG. 6. Here the equilibrium phase fields at 1000° C. are given as a function of Cr and V content. The Mo content is determined by the stoichiometry requirements, the matrix composition is taken from the earlier calculations, and the carbon content represents the case composition. The point on the diagram within the single phase FCC field that maximizes the V content and minimizes the Mo content represents the compromise fulfilling the design criteria. This composition is 4.8 wt % Cr, 0.03 wt % Mo, and 0.06 wt % V. A recalculation of the matrix composition using the final carbide formers results in an alloy composition of Fe—25 Co—3.8 Ni—4.8 Cr—0.03 Mo—0.06 V—0.55 (case)/0.25 (core) C (in wt %). Consistent with the model predictions of FIG. 3, a soluble boron addition of 15–20 ppm is added to enhance intergranular embrittlement resistance.

Figure 7:
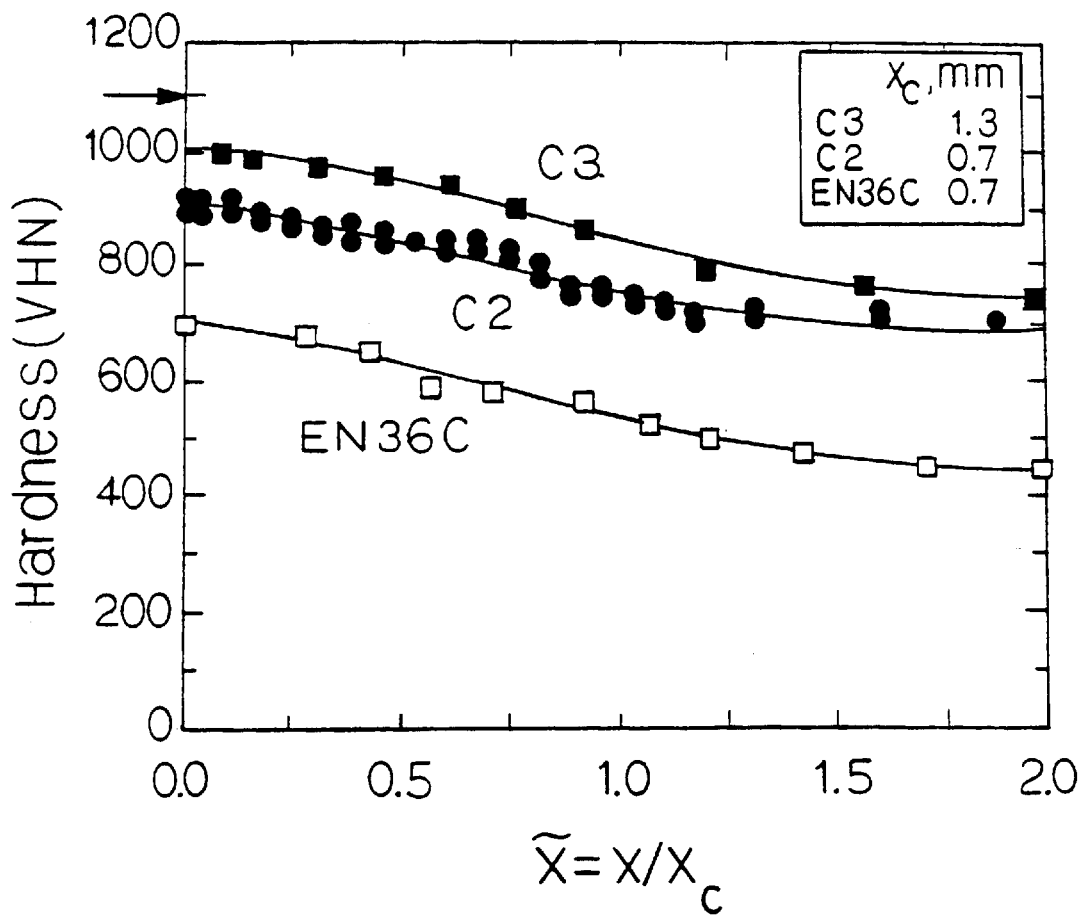
FIG. 7 is a graph comparing hardness of the steel alloys of the invention with conventional carburized alloys.

A 17 lb. vacuum induction heat of the above composition was prepared from high purity materials. The ingot was forged at 1150° C. in a bar 1.25" square by 38" long. The Ms temperature of the alloy was determined from dilatometery and found to agree with model predictions. The solution treatment response of the alloy was determined from hardness measurements in the stage I tempered condition. The optimum processing conditions for the core material was determined to be a 1050° C. 1 hour solution treatment followed by an oil quench and a liquid nitrogen deep freeze. After optimal solution treatment, a 12 hour temper at 482° C. results in the desired overaged hardness of 55 $R_c$ for the core material. The material was then plasma carburized and processed using these parameters. The C potential, temperature and time used in the carburizing treatment were determined from simulations with multicomponent diffusion software to provide the target surface carbon content of 0.55 wt % and a 1 mm case depth. The curve labeled C2 in FIG. 7 represents the hardness profile achieved for the carburized sample. A surface hardness of 67 $HR_c$ and a case depth of 1 mm are obtained.

Using techniques and processes of this nature, the following alloys set forth in Table 1 were developed and tested:

TABLE 1

| Alloy | Fe | Co | Ni | Cr | Mo | V | C (Core) |
|---|---|---|---|---|---|---|---|
| A1 | Bal. | 18 | 9.5 | 3.5 | 1.1 | 0.08 | 0.20 |
| C2 | Bal. | 25 | 3.8 | 4.8 | 0.03 | 0.06 | 0.237 |
| C3 | Bal. | 28 | 3.25–3.15 | 5.0 | 1.75–2.50 | 0.025 | 0.05–0.18 |
| CS1 | Bal. | 15 | 1.5 | 9.0 | 0.0 | 0.2 | 0.05–0.20 |

Figure 8:
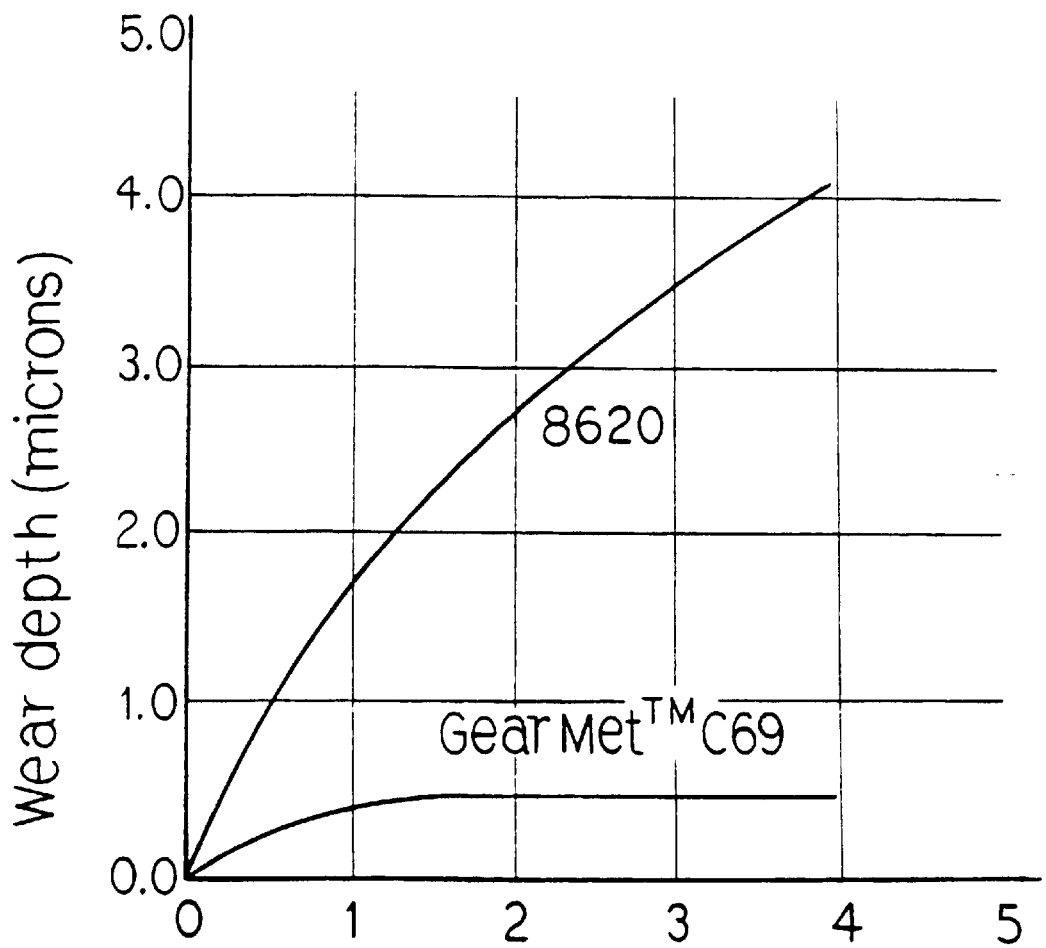
FIG. 8 is a graph containing Falex wear test data for steel alloys of the invention in comparison with conventional 8620 steel.
Figure 9:
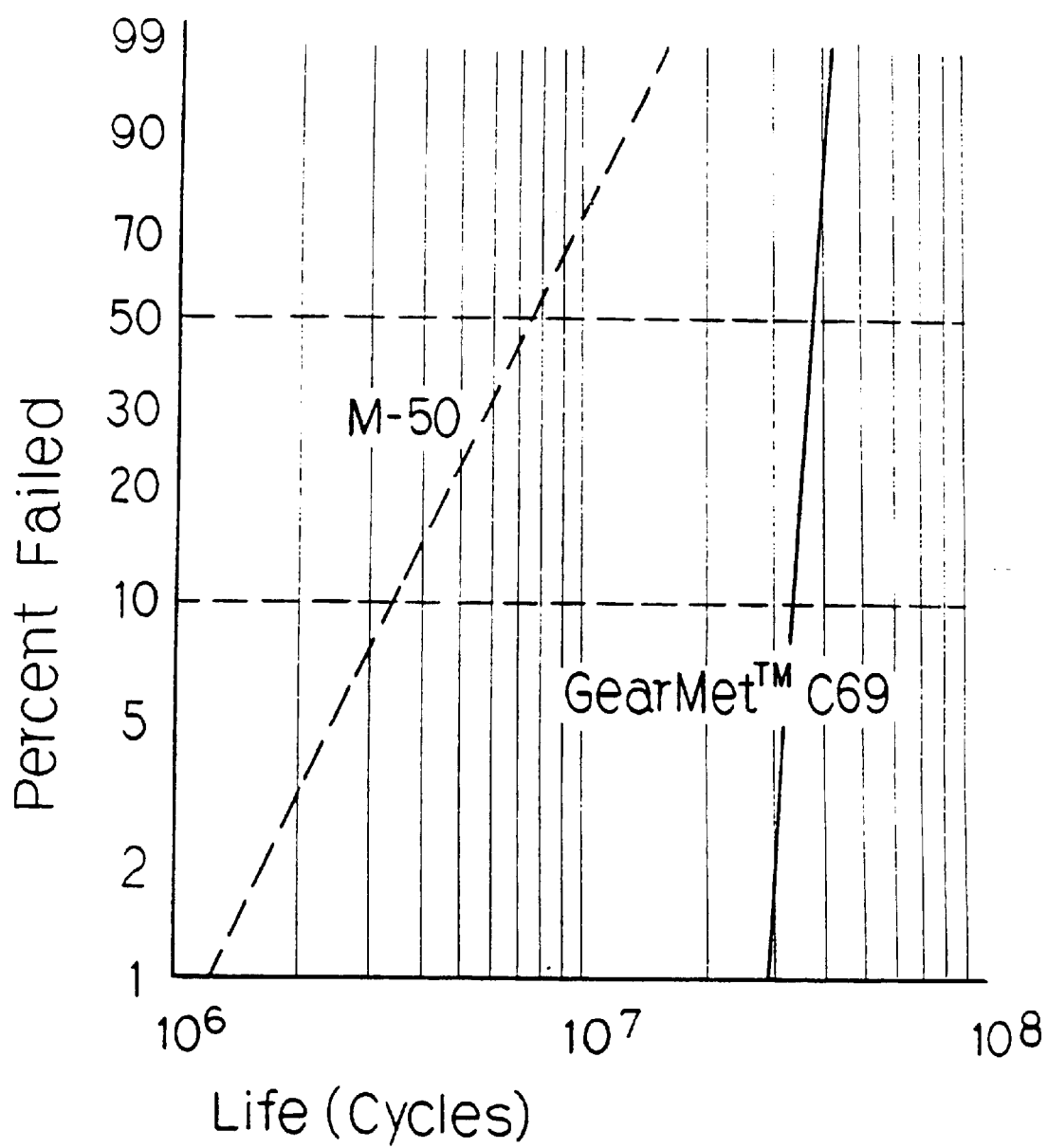
FIG. 9 is a graph of NTN 3 ball-on-rod rolling contact fatigue data for alloys of the invention in comparison with conventional M50 bearing steel.

The first, A1, is targeted as a replacement for current gear materials in applications where component redesign is not feasible but higher core strength and toughness is needed. As such, A1 has surface wear properties similar to current commercial properties, but possesses superior core toughness and strength 54 HRC and a $K_{IC}$ of >75 Ks√in. The second alloy C2 corresponds to the prototype alloy just described. The third alloy, C3, pushes the surface properties s far as possible while maintaining adequate core strength and toughness. As also shown by the hardness profiles of FIG. 7, the alloy has reached a surface hardness corresponding to HRC 69. Wear tests for the carburized material in a standard Falex gear simulator show much reduced weight loss compared to standard carburized 8620 steel in FIG. 8. A ball-on-rod rolling contact fatigue test (NTN type) conducted at 786 ksi Hertzian contact stress indicates an order of magnitude increase in $L_{10}$ fatigue life compared to M50 bearing steel as shown in FIG. 9. The fourth alloy in Table 1, CS1, represents a stainless variant of this class of alloy. Targeted to match the surface properties of standard non-stainless gear and bearing materials with sufficient core strength and toughness, the alloy has achieved corrosion resistance better than 440C by anodic polarization conducted in distilled water with a neutral ph. (sucrose added for electrical conductivity). Similar relative behaviors were demonstrated in 3.5% NaCl solution. In salt fog tests, CS1 outperformed 440C and commercial carburizing stainless steels, the performance gap widened when the tests were completed on samples in the carburized condition. The carburized alloy achieved surface mechanical properties equivalent to A1 while maintaining corrosion resistance. In RFC tests of the type represented in FIG. 9, both A1 and CS1 showed $L_{10}$ fatigue life equal or superior to the M50 bearing steel. The table (Table 2) below summarizes the performance achieved in the four alloys:

TABLE 2

| Alloy | Core Hardness[1] | Core Toughness[2] | Surface Hardness[3] | Bending Fatigue[4] | Rolling Contact Fatigue[5] $L_{10}$ | Corrosion Resistance[6] |
|---|---|---|---|---|---|---|
| A1 | 54 $R_c$ | >75 ksi√in | >61 $R_c$ | ≧EN36C | ≧M50 | NA |
| C2 | ≦58 $R_c$ | adjustable | 67 $R_c$ | NA | in process | NA |
| C3 | ≦59 $R_c$ | adjustable | 69 $R_c$ | NA | 10 × M50 | NA |
| CS1 | ≦53 $R_c$ | >25 ksi√in adjustable | 63 $R_c$ | NA | ≧M50 | >440C |

[1] Hardness determined by ASTM E18.
[2] Core toughness determined by ASTM E813.
[3] Surface hardness determined by E384.
[4] Bending fatigue determined using 4-point bend testing.
[5] Rolling contact fatigue determined by NTN 3 ball-on-rod techniques.
[6] Corrosion resistance determined by anodic polizations and salt for testing.

Each alloy has a surface hardness exceeding and core hardness exceeding prior art compositions achieved at a lower cost. The alloys of the invention are compounded and made in accord with this disclosure, but variants within the skill of the art are possible. The invention is therefore limited only by the following claims and equivalents.

What is claimed is:

1. A class of steel alloys comprising, in combination:

a case hardened mixture of about 0.05 to 0.24 weight percent carbon in combination with about 15 to 28 weight percent cobalt, about 1.5 to 9.5 weight percent nickel, and one or more additives taken from the group consisting of: about 3.5 to 9.0 weight percent chromium, up to about 2.5 weight percent molybdenum, and up to 0.2 weight percent vanadium; and the balance iron wherein the mixture is case hardened in the range of surface hardness greater than about 60 Rockwell C.

2. A class of steel alloys comprising, in combination:

a case hardened mixture of about 0.05 to 0.24 weight percent carbon in combination with about 15 to 28 weight percent cobalt, about 1.5 to 9.5 weight percent nickel, and one or more additives taken from the group consisting of: about 3.5 to 9.0 weight percent chromium, up to about 2.5 weight percent molybdenum, and up to 0.2 weight percent vanadium; and the balance iron wherein the mixture is core hardened in the range greater than about 50 Rockwell C.

3. A gear comprising an alloy of a case hardened mixture of about 0.05 to 0.24 weight percent carbon in combination with about 15 to 28 weight percent cobalt, about 1.5 to 9.5 weight percent nickel, and one or more additives taken from the group consisting of: about 3.5 to 9.0 weight percent chromium, up to about 2.5 weight percent molybdenum, and up to 0.2 weight percent vanadium; and the balance iron.

* * * * *